United States Patent
Lee et al.

(10) Patent No.: US 10,091,502 B2
(45) Date of Patent: *Oct. 2, 2018

(54) INTRA PREDICTION MODE ENCODING/DECODING METHOD AND APPARATUS FOR SAME

(71) Applicant: Electronics and Telecommunications Research Institute, Daejeon (KR)

(72) Inventors: Ha Hyun Lee, Seoul (KR); Hui Yong Kim, Daejeon-si (KR); Sung Chang Lim, Daejeon (KR); Jong Ho Kim, Daejeon-si (KR); Jin Ho Lee, Daejeon-si (KR); Se Yoon Jeong, Daejeon-si (KR); Suk Hee Cho, Daejeon-si (KR); Jin Soo Choi, Daejeon-si (KR); Jin Woong Kim, Daejeon-si (KR); Chie Teuk Ahn, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/799,086

(22) Filed: Oct. 31, 2017

(65) Prior Publication Data

US 2018/0063524 A1    Mar. 1, 2018

Related U.S. Application Data

(63) Continuation of application No. 15/477,714, filed on Apr. 3, 2017, now Pat. No. 9,838,689, which is a (Continued)

(30) Foreign Application Priority Data

Dec. 21, 2010  (KR) .................. 10-2010-0131086
Feb. 24, 2011  (KR) .................. 10-2011-0016610
(Continued)

(51) Int. Cl.
*H04N 7/12*   (2006.01)
*G06K 9/46*   (2006.01)
(Continued)

(52) U.S. Cl.
CPC ......... *H04N 19/107* (2014.11); *H04N 19/105* (2014.11); *H04N 19/109* (2014.11);
(Continued)

(58) Field of Classification Search
CPC ............. H04N 19/176; H04N 19/1887; H04N 19/157; H04N 19/00569
See application file for complete search history.

(56) References Cited

U.S. PATENT DOCUMENTS 8,948,259 B2 *  2/2015  Oh ................... H04N 19/159
                                            375/240.12
9,083,974 B2 *  7/2015  Jeon ................. H04N 19/105
(Continued)

FOREIGN PATENT DOCUMENTS

CN   1656818 A   8/2005
CN   1984340 A   6/2007
(Continued)

OTHER PUBLICATIONS

Office Action issued by the State Intellectual Property of the P.R.C (Sipo) dated Jan. 6, 2016 in correspondence to application No. 201180068084.7 (6 pages in English; 7 pages in Chinese).
(Continued)

*Primary Examiner* — Tsion B Owens
(74) *Attorney, Agent, or Firm* — Wong & Rees LLP

(57) ABSTRACT

An intra prediction method according to the present invention comprises the following steps: deriving neighboring prediction mode information from a left neighboring prediction mode and a top neighboring prediction mode; deriving an intra prediction mode for a target unit to be decoded, using the derived neighboring prediction mode information; and performing intra prediction for the target unit to be
(Continued)

decoded, based on the intra prediction mode. According to the present invention, video encoding/decoding efficiency may be improved.

7 Claims, 14 Drawing Sheets

Related U.S. Application Data continuation of application No. 15/055,150, filed on Feb. 26, 2016, now Pat. No. 9,648,327, which is a continuation of application No. 13/988,958, filed as application No. PCT/KR2011/009957 on Dec. 21, 2011, now Pat. No. 9,350,993.

(30) Foreign Application Priority Data

May 18, 2011 (KR) .......................... 10-2011-0046785
Dec. 21, 2011 (KR) .......................... 10-2011-0139469

(51) Int. Cl.
| | |
|---|---|
| H04N 19/107 | (2014.01) |
| H04N 19/593 | (2014.01) |
| H04N 19/176 | (2014.01) |
| H04N 19/196 | (2014.01) |
| H04N 19/13 | (2014.01) |
| H04N 19/61 | (2014.01) |
| H04N 19/11 | (2014.01) |
| H04N 19/157 | (2014.01) |
| H04N 19/169 | (2014.01) |
| H04N 19/50 | (2014.01) |
| H04N 19/137 | (2014.01) |
| H04N 19/513 | (2014.01) |
| H04N 19/70 | (2014.01) |
| H04N 19/105 | (2014.01) |
| H04N 19/109 | (2014.01) |
| H04N 19/159 | (2014.01) |
| H04N 19/52 | (2014.01) |
| H04N 19/91 | (2014.01) |

(52) U.S. Cl.
CPC ............ *H04N 19/11* (2014.11); *H04N 19/13* (2014.11); *H04N 19/137* (2014.11); *H04N 19/157* (2014.11); *H04N 19/159* (2014.11); *H04N 19/176* (2014.11); *H04N 19/1887* (2014.11); *H04N 19/196* (2014.11); *H04N 19/50* (2014.11); *H04N 19/52* (2014.11); *H04N 19/521* (2014.11); *H04N 19/593* (2014.11); *H04N 19/61* (2014.11); *H04N 19/70* (2014.11); *H04N 19/91* (2014.11)

(56) References Cited

U.S. PATENT DOCUMENTS

| | | | |
|---|---|---|---|
| 2003/0223495 A1 | 12/2003 | Sun et al. | |
| 2007/0098067 A1 | 5/2007 | Kim et al. | |
| 2008/0310504 A1 | 12/2008 | Ye et al. | |
| 2009/0225834 A1 | 9/2009 | Song et al. | |
| 2011/0292994 A1* | 12/2011 | Lim ..................... | H04N 19/182 375/240.02 |
| 2011/0317757 A1* | 12/2011 | Coban ................. | H04N 19/197 375/240.02 |
| 2012/0020580 A1* | 1/2012 | Sasai .................... | H04N 19/176 382/233 |
| 2013/0114712 A1* | 5/2013 | Yamamoto ........ | H04N 19/00569 375/240.12 |
| 2013/0170546 A1* | 7/2013 | Kim ....................... | H04N 19/50 375/240.12 |
| 2015/0036743 A1* | 2/2015 | Lee ......................... | H04N 19/30 375/240.12 |

FOREIGN PATENT DOCUMENTS

| | | |
|---|---|---|
| EP | 2 106 148 A2 | 9/2009 |
| KR | 10-0798446 B1 | 1/2008 |
| KR | 10-0871588 B1 | 12/2008 |
| KR | 10-2009-0012985 A | 2/2009 |
| KR | 10-2010-0002261 A | 1/2010 |
| KR | 10-2010-0112247 A | 10/2010 |
| WO | WO 2003/101117 A1 | 12/2003 |
| WO | 2010090749 A1 | 8/2010 |

OTHER PUBLICATIONS

Japanese Office Action dated Mar. 14, 2014 in counterpart to Japanese Application No. 2013-540907, (3 pages, in Japanese).

Japanese Office Action dated Sep. 30, 2014 by the Japanese Patent Office in corresponding Japanese Application No. 2013-540907. (5 pages in Japanese).

Japanese Office Action dated Jun. 2, 2015 by the Japanese Patent Office in corresponding Japanese Application No. 2014-122758. (2 pages in Japanese).

Korean Office Action dated Sep. 30, 2014 in counterpart Korean Application No. 10-2011-0139469 (4 pages in Korean).

Huang, Yu-Wen, et al. "A Technical Description of Medi Tek's Proposal; to the JCT-VC CFP" Joint Collaborative Team on Video Coding (JCT-VC) of ITU-T SG16 WP3 and ISO/IEC JTC1/SC29/WG11 JVTVC-A109_r2, (2010) ; 1-9 (10 pages in English, with JPO coversheet).

Lei et al. "Description of Core Experiment 14: Intra Mode Coding."Joint Collaborative Team on Video Coding (JCT-VC) of ITU_T SG16 wp3 and ISO/IEC JTC/SC29/WG11 JCTVC-D614 (2011) 7 pages in English, with JPO coversheet).

Lin Y. et al. "Modifications to intra frame coding,"Joint Collaborative Team on Video Coding (JCT-VC) of ITU-T SG16 Wp3 and ISO, 7$^{th}$ Meeting. Geneva, Switzerland, Nov. 2011 (12 pages in English).

Kumakura T., et al. "Fixing the number of mpm Candidates." Joint Collaborative Team on Video Coding (JCT-VC) of ITU-T SG16 WP3 and ISO. 6$^{th}$ Meeting. Torino, Italy. Jul. 2011 (pp. 1-8 in English).

Kumakuura T., et al. "Intra prediction mode coding based on direction difference."Joint Collaborative Team on Video Codinf (JCT_VC) of ITU-T SG16 WP3 and ISO. 6 th Meeting.. Torino, Italy. Jul. 2011 ( 13 pages in English).

V. Seregin,"Intra mode parsing without access neighboring information" The 6$^{th}$ meeting of The joint Collaborative Team on Video Coding (JCT-VC) of ITU-T SG16 WP3 and ISO/IEC JTC1/SC29 WG11, Torino, IT Jul. 14-22, 2011, Document: JCTVC-F378 (pp. 1-4).

International Search Report dated Jun. 29, 2012 in corresponding International Patent Application No. PCT/KR2011/009957 (3 pages, in Korean).

Extended European Search Report dated Aug. 4, 2015, in counterpart European Application No. 11850654.2 (7 pages in English).

Extended European Search Report dated Dec. 9, 2015, in counterpart of European Application No. 11850654.2 (13 pages in English).

Wei-Jung Chien, et al., "Parsing friendly intra mode coding", Proceedings from the 6th Meeting of the Joint Collaborative Team on Video Coding (JCT-VC) of ITU-T SG16 WP3 and ISO/IEC JTC1/SC29/WG11, document JCTVC-F459, Torino, IT, Jul. 14-22, 2011 (pp. 1-5).

* cited by examiner

FIG. 6

| PREDICTION MODE | 0(VER) | 1(HOR) | 2(DC) | ... | 31(HOR+3) | 32(HOR+5) | 33(HOR+7) |
|---|---|---|---|---|---|---|---|
| 0(VER) | 0 | 90 | 180 | ... | 105 | 115 | 125 |
| 1(HOR) | 90 | 0 | 180 | ... | 15 | 25 | 35 |
| 2(DC) | 180 | 180 | 0 | 180 | 180 | 180 | 180 |
| ... | ... | ... | ... | ... | ... | ... | ... |
| 31(HOR+3) | 105 | 15 | 180 | ... | 0 | 10 | 20 |
| 32(HOR+5) | 115 | 25 | 180 | ... | 10 | 0 | 10 |
| 33(HOR+7) | 125 | 35 | 180 | ... | 20 | 10 | 0 |

610

| CLASSIFICATION ACCORDING TO ANGULAR DIFFERENCE | CONTEXT CATEGORY (ctx_cat) | | | |
|---|---|---|---|---|
| | 0 (d≤Th1) | 1 (Th1<d≤Th2) | 2 (Th2<d≤Th3) | 3 (d>Th3) |
| SYNTAX ELEMENT | ctx1 | ctx2 | ctx3 | ctx4 |

620

| CLASSIFICATION ACCORDING TO ANGULAR DIFFERENCE | CONTEXT CATEGORY (ctx_cat) | | | |
|---|---|---|---|---|
| | 0 (d≤45) | 1 (45<d≤90) | 2 (90<d≤135) | 3 (d>135) |
| SYNTAX ELEMENT | ctx1 | ctx2 | ctx3 | ctx4 |

| PREDICTION MODE | 0(VER) | 1(HOR) | 2(DC) | ... | 31(HOR+3) | 32(HOR+5) | 33(HOR+7) |
|---|---|---|---|---|---|---|---|
| 0(VER) | 0 | 90 | 180 | ... | 105 | 115 | 125 |
| 1(HOR) | 90 | 0 | 180 | ... | 15 | 25 | 35 |
| 2(DC) | 180 | 180 | 0 | 180 | 180 | 180 | 180 |
| ... | ... | ... | 180 | 0 | ... | ... | ... |
| 31(HOR+3) | 105 | 15 | 180 | ... | 0 | 10 | 20 |
| 32(HOR+5) | 115 | 25 | 180 | ... | 10 | 0 | 10 |
| 33(HOR+7) | 125 | 35 | 180 | ... | 20 | 10 | 0 |

720

| CLASSIFICATION ACCORDING TO ANGULAR DIFFERENCE | 0 (d≤Th1) | 1 (Th1<d≤Th2) | 2 (Th2<d≤Th3) | 3 (d>Th3) |
|---|---|---|---|---|
| VLC TABLE CATEGORY SYNTAX ELEMENT | VLC1 | VLC2 | VLC3 | VLC4 |

730

| CLASSIFICATION ACCORDING TO ANGULAR DIFFERENCE | 0 (d≤45) | 1 (45<d≤90) | 2 (90<d≤135) | 3 (d>135) |
|---|---|---|---|---|
| VLC TABLE CATEGORY SYNTAX ELEMENT | VLC1 | VLC2 | VLC3 | VLC4 |

740

| CLASSIFICATION ACCORDING TO ANGULAR DIFFERENCE | ANGULAR DIFFERENCE(d)==0 | ANGULAR DIFFERENCE(d)!=0 |
|---|---|---|
| VLC TABLE CATEGORY SYNTAX ELEMENT | VLC1 | VLC2 |

FIG. 8

| SYMBOL VALUE | VLC1 | VLC2 | VLC3 | VLC4 |
|---|---|---|---|---|
| 0 | 1 | 10 | 100 | 1000 |
| 1 | 01 | 11 | 101 | 1001 |
| 2 | 001 | 010 | 110 | 1010 |
| 3 | 0001 | 011 | 111 | 1011 |
| 4 | 00001 | 0010 | 1100 | 01000 |
| ... | ... | ... | ... | ... |

FIG. 11

|  | (ANGULAR DIFFERENCE)d ≤ TH1(90) | (ANGULAR DIFFERENCE)d > TH1(90) |
|---|---|---|
| MODE NUMBER (0~8) | ctx1 | ctx2 |
| MODE NUMBER (9~33) | ctx3 | ctx4 |

FIG. 12

|  | ANGULAR DIFFERENCE (d)=0 | ANGULAR DIFFERENCE (d)!=0 |
|---|---|---|
| MODE NUMBER (0~8) | VLC1 | VLC2 |
| MODE NUMBER (9~33) | VLC3 | VLC4 |

INTRA PREDICTION MODE ENCODING/DECODING METHOD AND APPARATUS FOR SAME

CROSS REFERENCE

This present application is a Continuation of U.S. patent application Ser. No. 15/477,714, filed Apr. 3, 2017, which is a continuation of U.S. patent application Ser. No. 15/055, 150, filed on Feb. 26, 2016, which is a Continuation of U.S. patent application Ser. No. 13/988,958 filed May 22, 2013, which is a National Stage of International Application No. PCT/KR2011/009957, filed Dec. 21, 2011 and published as WO 2012/087035 on Jun. 28, 2012, which claims benefit under 35 U.S.C. § 119(a) of Korean Patent Application No. 10-2010-0131086 filed Dec. 21, 2010, Korean Patent Application No. 10-2011-0016610 filed Feb. 24, 2011, Korean Patent Application No. 10-2011-0046785 filed May 18, 2011, and Korean Patent Application No. 10-2011-0139469 filed Dec. 21, 2011 in the Korean Intellectual Property Office. The entire disclosures of which are incorporated herein by reference for all purposes.

TECHNICAL FIELD

The present invention relates to image processing, and more particularly, to a method and an apparatus for encoding/decoding an intra prediction mode.

BACKGROUND ART

Recently, with the expansion of broadcasting services having high definition (HD) resolution in the country and around the world, many users have been accustomed to a high resolution and definition image, such that many organizations have conducted many attempts to develop next-generation image devices. In addition, the interest in HDTV and ultra high definition (UHD) having a resolution four times higher than that of HDTV have increased and thus, a compression technology for higher-resolution and higher-definition image have been required.

For the image compression, an inter prediction technology predicting pixel values included in a current picture from a picture before and/or after the current picture, an intra prediction technology predicting pixel values included in a current picture using pixel information in the current picture, an entropy encoding technology allocating a short code to symbols having a high appearance frequency and a long code to symbols having a low appearance frequency, or the like, may be used.

DISCLOSURE

Technical Problem

The present invention provides an image encoding method and apparatus capable of improving image encoding/decoding efficiency.

The present invention also provides an image decoding method and apparatus capable of improving image encoding/decoding efficiency.

The present invention also provides an intra prediction method and apparatus capable of improving image encoding/decoding efficiency.

The present invention also provides a method and an apparatus for encoding an intra prediction mode capable of improving image encoding/decoding efficiency.

The present invention also provides a method and an apparatus for decoding an intra prediction mode capable of improving image encoding/decoding efficiency.

Technical Solution

In an aspect, there is provided an intra prediction method, including: deriving neighbor prediction mode information from a left neighbor prediction mode and an upper neighbor prediction mode; deriving an intra prediction mode for a decoding target unit by using the derived neighbor prediction mode information; and performing intra prediction on the decoding target unit based on the derived intra prediction mode, wherein the left neighbor prediction mode is an intra prediction mode of a left neighbor unit adjacent to the left of the decoding target unit and the upper neighbor prediction mode is an intra prediction mode of the upper neighbor unit adjacent to the upper of the decoding target unit, and the neighbor prediction mode information includes at least one of angular difference information and mode number information, the angular difference information includes an angular difference value between an angle of the left neighbor prediction mode and an angle of the upper neighbor prediction mode, and the mode number information includes a mode number of the left neighbor prediction mode and a mode number of the upper neighbor prediction mode.

The deriving of the intra prediction mode may further include: receiving and decoding an MPM index for the decoding target unit; determining most probable mode (MPM) candidates for the decoding target unit by using the neighbor prediction mode information; generating an MPM list by using the determined MPM candidates; and deriving the intra prediction mode of the decoding target unit by using the decoded MPM index and the generated MPM list, wherein the MPM index is an index indicating the same candidate as the intra prediction mode of the decoding target unit, among the MPM candidates included in the MPM list.

The determining of the MPM candidates may further include: determining the left neighbor prediction mode and the upper neighbor prediction mode as the MPM candidates, wherein the number of MPM candidates included in the MPM list is a predetermined fixed number.

The determining of the MPM candidates may further include determining the predetermined intra prediction mode as additional MPM candidates, when the left neighbor prediction mode is the same as the upper neighbor prediction mode.

The predetermined intra prediction mode may be a planar mode.

The predetermined intra prediction mode may be a DC mode when the left neighbor prediction mode and the upper neighbor prediction mode are a planar mode.

The determining of the MPM candidates may further include determining the predetermined intra prediction mode as the additional MPM candidates when the left neighbor unit or the upper neighbor unit is not available.

The predetermined intra prediction mode may be a planar mode.

The deriving of the intra prediction mode may include: selecting a context model for the decoding target unit among the plurality of context models by using the neighbor prediction mode information; and performing entropy decoding on the intra prediction mode information of the decoding target unit by using the selected context model, wherein the intra prediction mode information includes at least one of an MPM flag, an MPM index, and a remaining mode.

The selecting of the context model may select a context model corresponding to the angular difference information as the context model for the decoding target unit.

The selecting of the context model may select the context model corresponding to the mode number information as the context model for the decoding target unit.

The selecting of the context model may select the context model corresponding to the angular difference information and the mode number information as the context model for the decoding target unit.

The deriving of the intra prediction mode may further include: selecting a VLC table for the decoding target unit among a plurality of variable length coding (VLC) table by using the neighbor prediction mode information; and performing entropy decoding on the intra prediction mode information of the decoding target unit by using the selected VLC table, wherein the intra prediction mode includes at least one of an MPM flag, an MPM index, and a remaining mode.

The selecting of the VLC table may select the VLC table corresponding to the angular difference information as the VLC table for the decoding target unit.

The selecting of the VLC table may select the VLC table corresponding to the mode number information as the VLC table for the decoding target unit.

The selecting of the VLC table may select the VLC table corresponding to the angular difference information and the mode number information as the VLC table for the decoding target unit.

In another aspect, there is provided a method for decoding an intra prediction mode, including: deriving neighbor prediction mode information from a left neighbor prediction mode and an upper neighbor prediction mode; and deriving an intra prediction mode for a decoding target unit by using the derived neighbor mode information, wherein the left neighbor prediction mode is an intra prediction mode of a left neighbor unit adjacent to the left of the decoding target unit and the upper prediction mode is an intra prediction mode of an upper neighbor unit adjacent to the upper of the decoding target unit, and the neighbor prediction mode information includes at least one of angular difference information and mode number information, the angular difference information includes an angular difference value between an angle of the left neighbor prediction mode and an angle of the upper neighbor prediction mode, and the mode number information includes a mode number of the left neighbor prediction mode and a mode number of the upper neighbor prediction mode.

The deriving of the intra prediction mode may further include: receiving and decoding an MPM index for the decoding target unit; determining most probable mode (MPM) candidates for the decoding target unit by using the neighbor prediction mode information; generating an MPM list by using the determined MPM candidates; and deriving the intra prediction mode of the decoding target unit by using the decoded MPM index and the generated MPM list, wherein the MPM index is an index indicating the same candidate as the intra prediction mode of the decoding target unit, among the MPM candidates included in the MPM list.

The deriving of the intra prediction mode may include: selecting a context model for the decoding target unit among the plurality of context models by using the neighbor prediction mode information; and performing entropy decoding on the intra prediction mode information of the decoding target unit by using the selected context model, wherein the intra prediction mode information includes at least one of an MPM flag, an MPM index, and a remaining mode.

The deriving of the intra prediction mode may further include: selecting a VLC table for the decoding target unit among a plurality of variable length coding (VLC) table by using the neighbor prediction mode information; and performing entropy decoding on the intra prediction mode information of the decoding target unit by using the selected VLC table, wherein the intra prediction mode includes at least one of an MPM flag, an MPM index, and a remaining mode.

Advantageous Effects

The image encoding method according to the exemplary embodiments of the present invention can improve the image encoding/decoding efficiency.

Further, the image decoding method according to the exemplary embodiments of the present invention can improve the image encoding/decoding efficiency.

The intra prediction method according to the exemplary embodiments of the present invention can improve the image encoding/decoding efficiency.

The method for encoding an intra prediction mode according to the exemplary embodiments of the present invention can improve the image encoding/decoding efficiency.

The method for decoding an intra prediction mode according to the exemplary embodiments of the present invention can improve the image encoding/decoding efficiency.

DESCRIPTION OF DRAWINGS

FIG. 6 is a table showing an exemplary embodiment of a method for selecting a context model according to angular difference information.

FIG. 7 is a table showing an exemplary embodiment of a method for selecting a VLC table according to the angular difference information.

FIG. 8 is a table showing an example of codewords allocated to each of the plurality of VLC tables.

FIG. 11 is a table showing an exemplary embodiment of a method for selecting a context model using the angular difference information between the neighbor prediction modes and the mode number information on the neighbor prediction modes.

FIG. 12 is a table showing an exemplary embodiment of a method for selecting a VLC table using the angular difference information between the neighbor prediction modes and the mode number information on the neighbor prediction modes.

MODE FOR INVENTION

Hereinafter, exemplary embodiments of the present invention will be described in detail with reference to the accompanying drawings. In describing exemplary embodiments of the present invention, well-known functions or constructions will not be described in detail since they may unnecessarily obscure the understanding of the present invention.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. Further, in the present invention, "comprising" a specific configuration will be understood that additional configuration may also be included in the embodiments or the scope of the technical idea of the present invention.

Terms used in the specification, 'first', 'second', etc. can be used to describe various components, but the components are not to be construed as being limited to the terms. The terms are only used to differentiate one component from other components. For example, the 'first' component may be named the 'second' component without being departed from the scope of the present invention and the 'second' component may also be similarly named the 'first' component.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Figure 1:
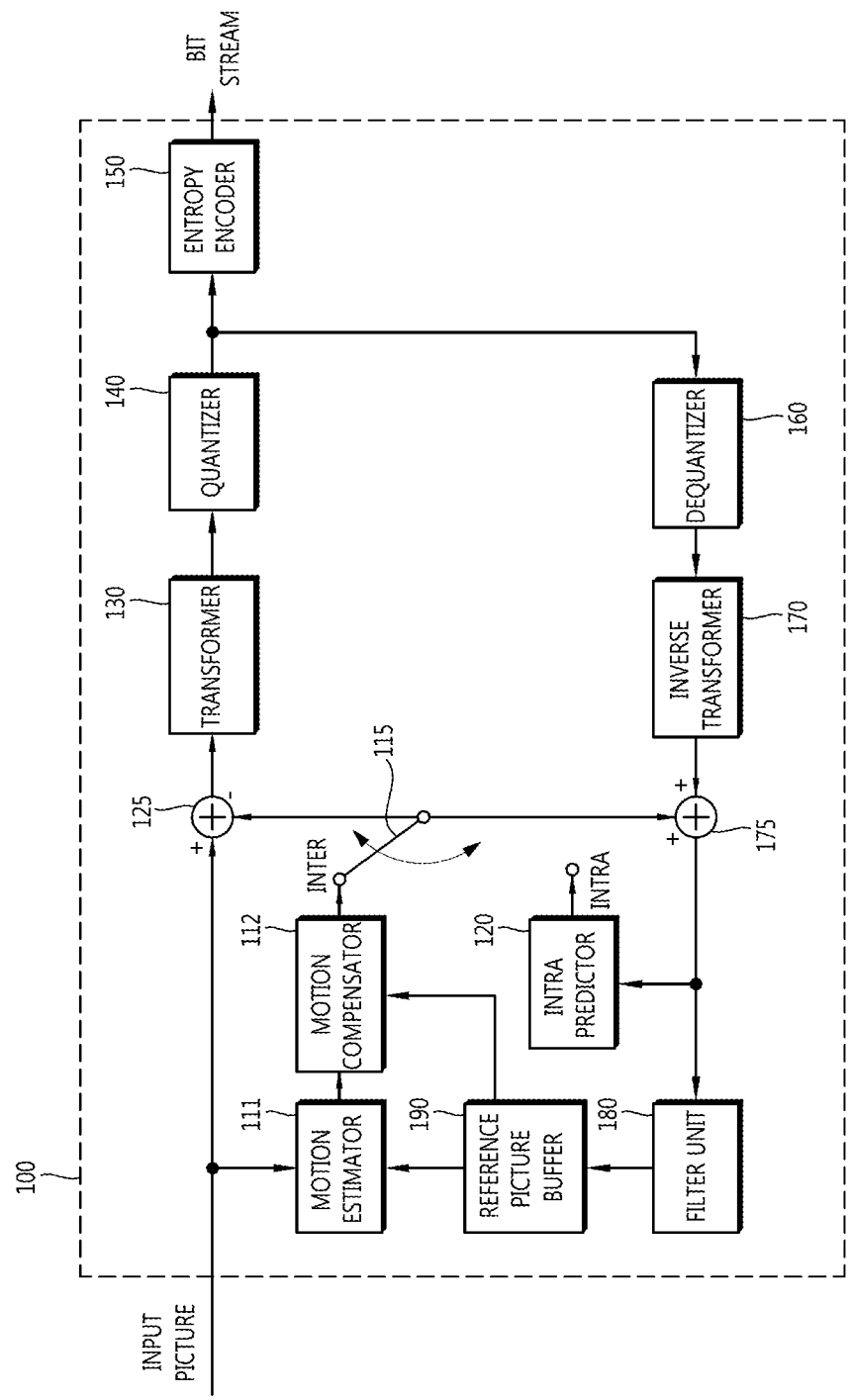
FIG. 1 is a block diagram showing a configuration of an image encoding apparatus according to an exemplary embodiment of the present invention.

FIG. 1 is a block diagram showing a configuration of an image encoding apparatus according to an exemplary embodiment of the present invention.

Referring to FIG. 1, an image encoding apparatus 100 includes a motion estimator 111, a motion compensator 112, an intra predictor 120, a switch 115, a subtractor 125, a transformer 130, a quantizer 140, an entropy encoder 150, a dequantizer 160, an inverse transformer 170, an adder 175, a filter unit 180, and a reference picture buffer 190.

The image encoding apparatus 100 may perform encoding on input images with an intra mode or an inter mode to output bitstreams. The intra prediction means intra-picture prediction and the inter prediction means inter-picture prediction. In the case of the intra mode, the switch 115 may be switched to intra and in the case of the inter mode, the switch 115 may be switched to inter. The image encoding apparatus 100 may generate a predicted block for an input block of the input images and then, encode residuals between the input block and the predicted block.

In the case of the intra mode, the intra predictor 120 may perform spatial prediction using the pixel values of the previously encoded blocks around the current block to generate the predicted block.

In the case of the inter mode, the motion estimator 111 may obtain a motion vector by searching a region optimally matched with the input block in a reference picture stored in the reference picture buffer 190 during a motion prediction process. The motion compensator 112 may perform the motion compensation by using the motion vector to generate the predicted block.

The subtractor 125 may generate a residual block due to the residuals of the input block and the generated predicted block. The transformer 130 may output transform coefficients by performing a transform on the residual block. Further, the quantizer 140 may quantize the input transform coefficient according to quantization parameters to output quantized coefficients.

The entropy encoder 150 may perform entropy encoding on the symbols according to the probability distribution based on values calculated in the quantizer 140 or coding parameter values calculated during the encoding process, or the like, calculated during the encoding process to output bitstreams. The entropy encoding method is a method that receives the symbols having various values and represents the input symbols by decodable bin sequence/string while removing statistical redundancy.

In this case, the symbol means an encoding/decoding target syntax element, a coding parameter, a value of a residual signal, or the like. The coding parameter, which is a parameter necessary for encoding and decoding, may include information that is encoded in the encoder like the syntax element and transferred to a decoder and information that may be derived during the encoding or decoding process and means the necessary information at the time of encoding and decoding the images. The coding parameter may include, for example, values or statistics, such as the intra/inter prediction mode, the movement/motion vector, the reference picture index, the encoding block pattern, the presence and absence of the residual signal, the quantization parameters, the unit size, the unit partition information, or the like.

When the entropy encoding is applied, the entropy encoding may represent symbols by allocating a small number of bits to the symbols having high occurrence probability and allocating a large number of bits to the symbols having low occurrence probability to reduce a size of the bitstreams for the encoding target symbols. Therefore, the compression performance of the image encoding may be increased through the entropy encoding.

For the entropy encoding, an encoding method such as exponential golomb, context-adaptive variable length coding (CAVLC), context-adaptive binary arithmetic coding (CABAC), or the like, may be used. For example, the entropy encoder 150 may be stored with a table for performing the entropy encoding such as variable length coding/code (VLC) table and the entropy encoder 150 may perform the entropy encoding using the stored variable length coding/code (VLC) table In addition, the entropy encoder 150 may also perform the entropy encoding by deriving the binarization method of the target symbols and the target symbol/bin probability model and then using the derived binarization method or the probability model.

In this case, the binarization means that the values of the symbols are represented by a bin sequence/string. In this case, the bin means each bin value (0 or 1) when the symbols are represented by the bin sequence/string through the binarization. The probability model means the predicted probability of the encoding/decoding target symbols/bins that may be derived through a context model. The context model is the probability mode for the bin of one or more binarized symbols and may be selected by the statistics of the recently encoded data symbols.

In more detail, the CABAC entropy encoding method binarizes the symbols that are not binarized and transform the binarized symbols into the bins, determines the context model by using the encoding information on the neighbor and encoding target blocks or the information on the symbols/bins encoded at a previous step, and generates the bitstream by performing arithmetic encoding of the bin by predicting the occurrence probability of the bin according to the determined context model. In this case, the CABAC entropy encoding method may determine the context model and then, update the context model by using the information on the symbols/bins encoded for the context model of the symbols/bins.

The image encoding apparatus according to the exemplary embodiment of FIG. 1 performs the inter prediction encoding, that is, the inter-picture prediction encoding and thus, the current encoded image needs to be decoded and stored so as to be used as the reference picture. Therefore, the quantized coefficient may be dequantized in the dequantizer 160 and inversely transformed in the inverse transformer 180. The dequantized, inverse transformed coefficients are added to the predicted block through the adder 175 and a reconstructed block is generated.

The reconstructed block passes through the filter unit 180 and the filter unit 180 may apply at least one of a deblocking filter, sample adaptive offset (SAO), and an adaptive loop filter (ALF) to the reconstructed block or a reconstructed picture. The reconstructed block passing through the filter unit 180 may be stored in the reference picture buffer 190.

Figure 2:
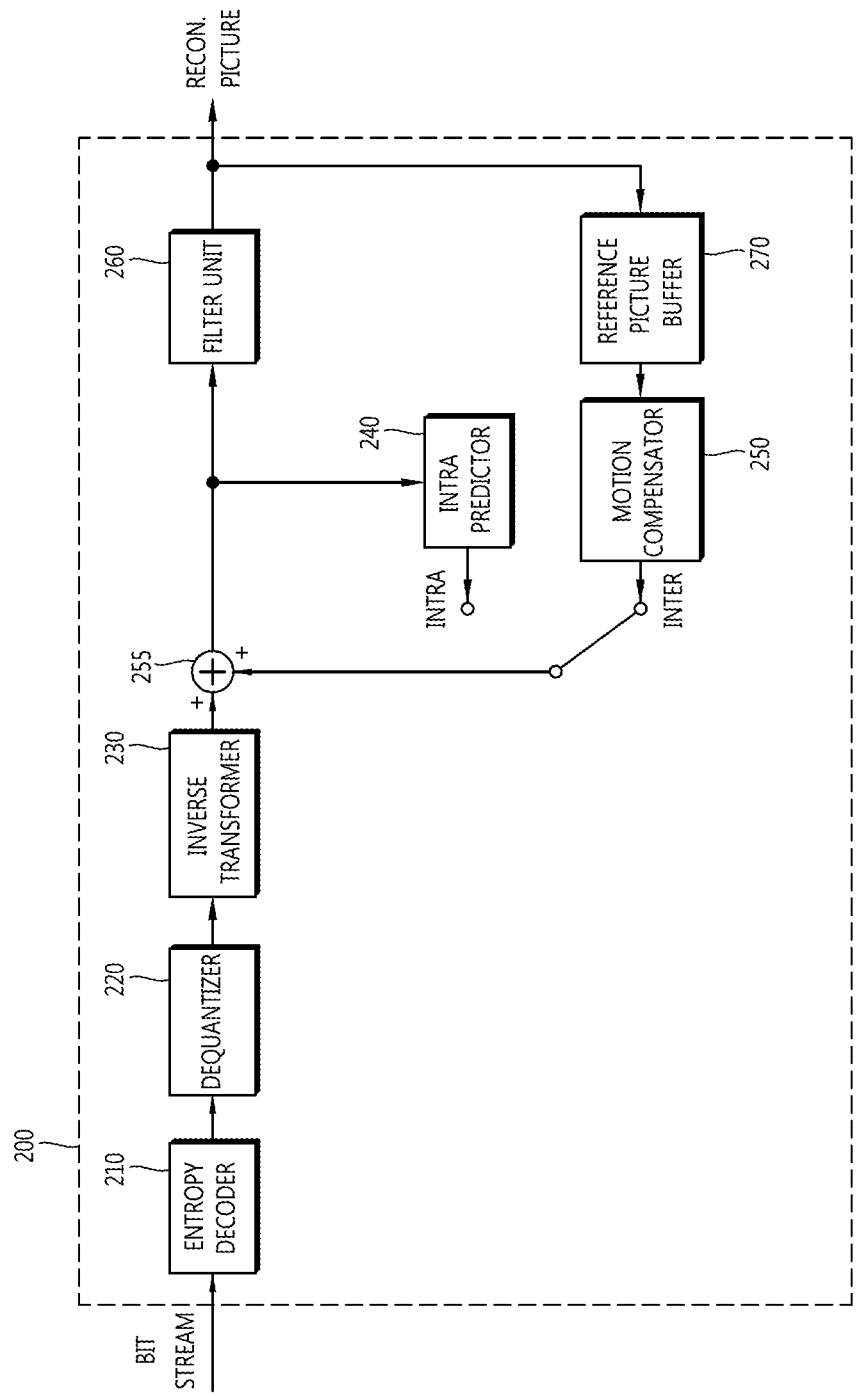
FIG. 2 is a block diagram showing a configuration of an image decoding apparatus to according to an exemplary embodiment of the present invention.

FIG. 2 is a block diagram showing a configuration of an image decoding apparatus to according to an exemplary embodiment of the present invention.

Referring to FIG. 2, an image decoding apparatus 200 includes an entropy decoder 210, a dequantizer 220, an inverse transformer 230, an intra predictor 240, a motion compensator 250, an adder 255, a filter unit 260, and a reference picture buffer 270.

The image decoding apparatus 200 may receive the bitstreams output from the encoder to perform the decoding with the intra mode or the inter mode and output the reconstructed image, that is, the reconstructed image. In the case of the intra mode, the switch may be switched to the intra and in the case of the inter mode, the switch may be switched to the inter mode. The image decoding apparatus 200 obtains the residual block from the received bitstreams and generates the predicted block and then, add the residual block and the predicted block, thereby generating the reconstructed block, that is, the reconstructed block.

The entropy decoder 210 may perform the entropy encoding on the input bitstreams according to the probability distribution to generate the symbols having the quantized coefficient type of symbols. The entropy encoding method is a method that receives the bin sequence/string and generates each symbol. The entropy decoding method is similar to the above-mentioned entropy encoding method.

In more detail, the CABAC entropy decoding method may receive the bin corresponding to each syntax element in the bitstreams, use the decoding target syntax element information and the decoding information on the neighbor and decoding target block or the information on the symbols/bins decoded at the previous step to determine the context model, and predict the occurrence probability of the bin according to the determined context model and performs the arithmetic decoding of the bin to generate the symbols corresponding to the values of each syntax element. In this case, the CABAC entropy decoding method may determine the context model and then, update the context model by using the information on the symbols/bins decoded for the context model of the symbols/bins.

When the entropy decoding method is applied, the entropy decoding method represents the symbols by allocating a small number of bits to the symbols having high occurrence probability and allocating a large number of bits to the symbols having low occurrence probability, thereby reducing the size of the bitstreams for each symbol. Therefore, the compression performance of the image decoding may be increased through the entropy decoding method.

The quantized coefficients are dequantized in the dequantizer 220 and are inversely transformed in the inverse transformer 230. The quantized coefficients may be dequantized/inversely transformed to generate the residual block.

In the case of the intra mode, the intra predictor 240 may perform spatial prediction using the pixel values of the previously encoded blocks around the current block to generate the predicted block. In the case of the inter mode, the motion compensator 250 performs the motion compensation by using the motion vector and the reference picture stored in the reference picture buffer 270, thereby generating the predicted block.

The residual block and the prediction block are added through the adder 255 and the added block passes through the filter unit 260. The filter unit 260 may apply at least one of the deblocking filter, the SAO, and the ALF to the reconstructed block or the reconstructed picture. The filter unit 260 outputs the reconstructed images, that is, the reconstructed images. The reconstructed image may be stored in the reference picture buffer 270 so as to be used for the inter prediction.

Hereinafter, the unit means a unit of the image encoding and decoding. At the time of the image encoding and decoding, the encoding or decoding unit means the divided unit when performing the encoding and decoding by dividing the images, which may be called a block, a coding unit (CU), an coding block, a prediction unit (PU), a prediction block a transform unit (TU), a transform block, or the like. The single unit may be subdivided into a lower unit having a smaller size.

Here, the prediction unit means a basic unit that is a unit of performing the prediction and/or the motion compensation. The prediction unit may be divided into a plurality of partitions and each partition may also be referred to as prediction unit partition. When the prediction unit is divided into a plurality of partitions, each of the plurality of partitions may be a basic unit that is a unit of performing the prediction and/or the motion compensation. Hereinafter, in the exemplary embodiment of the present invention, each partition in which the prediction unit is divided may also be referred to as the prediction unit.

Meanwhile, the intra prediction may be performed according to the intra prediction mode of the encoding/decoding target unit. In this case, each of the intra prediction mode may have the prediction direction corresponding thereto and each prediction direction may have a predetermined angle value. Therefore, the intra prediction mode of the encoding/decoding target unit may also represent the prediction direction information on the encoding/decoding target unit.

The encoder may encode the intra prediction mode and transmit the encoded intra prediction mode to the decoder. When the encoder encodes and transmits the intra prediction mode for the encoding target unit, in order to reduce the transmitted bit amount and increase the encoding efficiency, the method for predicting the intra prediction mode may be used.

The prediction mode of the encoding target unit has the high probability to be equal to the prediction mode of the reconstructed neighbor units and therefore, the prediction mode of the encoding target unit can be encoded by using the prediction mode of the reconstructed neighbor unit adjacent to the encoding target unit. Hereinafter, the prediction modes used as the prediction value for the intra prediction mode of the encoding target unit are referred to as a most probable mode (MPM). In this case, the reconstructed neighbor unit, which is a unit encoded or decoded in advance and reconstructed, may include a unit adjacent to the encoding/decoding target unit, a unit disposed at a right upper corner of the encoding/decoding target unit, a unit disposed at a left upper corner of the encoding/decoding target unit, and/or a unit disposed at a left lower corner of the encoding/decoding target unit.

Figure 3:
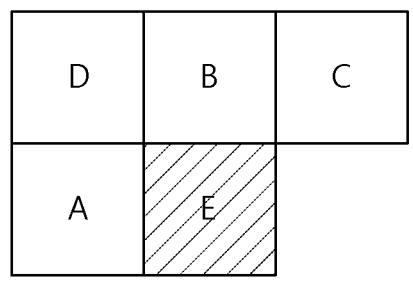
FIG. 3 is a conceptual diagram schematically showing an exemplary embodiment of a reconstructed neighbor unit for an encoding/decoding target unit.

FIG. 3 is a conceptual diagram schematically showing an exemplary embodiment of a reconstructed neighbor unit for an encoding/decoding target unit.

Referring to FIG. 3, as the reconstructed neighbor unit for the encoding/decoding target unit E, there may be the left neighbor unit A adjacent to the left of E unit, the upper neighbor unit B adjacent to the upper of E unit, the right upper corner unit C disposed at the right upper corner of E unit, and the left upper corner unit D disposed at the left upper corner of E unit, or the like.

Hereinafter, in the exemplary embodiments of the present invention to be described later, the left neighbor unit is referred to unit A, the upper neighbor unit is referred to as unit B, the right upper corner unit is referred to as unit C, and the left upper corner unit is referred to as unit D. In addition, the encoding/decoding target unit is referred to as unit E.

Figure 4:
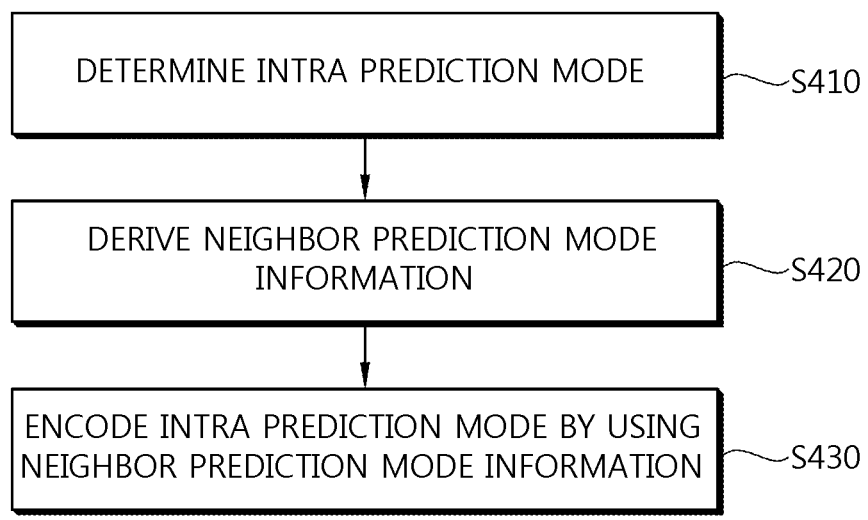
FIG. 4 is a flow chart schematically showing a method for encoding an intra prediction mode according to an exemplary embodiment of the present invention.

FIG. 4 is a flow chart schematically showing a method for encoding an intra prediction mode according to an exemplary embodiment of the present invention.

Referring to FIG. 4, the encoder may determine the intra prediction mode of the encoding target unit (S410).

In addition, the encoder may derive the information on the neighbor prediction mode (S420). Here, the neighbor prediction mode may mean the intra prediction mode of the reconstructed neighbor unit. Hereinafter, the information on the neighbor prediction mode is referred to as the neighbor prediction mode information.

Each of the reconstructed neighbor units may have the intra prediction mode. In this case, the encoder may derive the neighbor prediction mode information on the unit having the intra prediction mode among the reconstructed neighbor units. The angular difference between the neighbor prediction modes and/or the mode number of the neighbor prediction modes, or the like, may be in the neighbor prediction mode information.

As described above, each of the intra prediction mode may have the prediction direction corresponding thereto and each of the prediction direction may have a predetermined angle value. Therefore, each of the neighbor prediction modes may have a predetermined angle value and the encoder may derive the angular difference between the neighbor prediction modes. Hereinafter, the information on the angular difference between the neighbor prediction modes is the angular difference information.

In addition, each of the intra prediction modes may have a mode number corresponding thereto and the encoder may derive and/or discriminate the mode number of the neighbor prediction mode. The mode number allocated to the intra prediction mode may be determined according to the occurrence probability of the intra prediction mode. For example, the prediction mode having the high occurrence probability may be allocated with the low mode number. Therefore, the mode number of the neighbor prediction mode derived by the encoder may also represent the mode sequence of the neighbor prediction modes. Hereinafter, the information on the mode number of the neighbor prediction modes is referred to as the mode number information.

Referring again to FIG. 4, the encoder may use the derived neighbor prediction mode information to encode the intra prediction mode for the encoding target unit (S430).

The encoder may derive the MPM candidates for the encoding target unit so as to encode the intra prediction mode for the encoding target unit. The MPM candidates may be derived by using the intra prediction modes of the reconstructed neighbor unit. In this case, the encoder may use at least one of the prediction modes of units A, B, C, and D.

When the unavailable units are present in the reconstructed neighbor units, the encoder may not use the unavailable units for deriving the MPM candidates. In addition, among the reconstructed neighbor units, the encoded/decoded unit by the pulse code modulation (PCM) scheme and/or the encoded/decoded unit by the inter prediction may not include the information related to the intra prediction mode. Therefore, the encoded/decoded unit by the PCM scheme and/or the inter prediction may not be used to derive the MPM candidates. In addition, among the reconstructed neighbor units, the encoded/decoded unit may be presented by a constrained intra prediction (CIP) scheme, when the reconstructed neighbor unit is CIP and its intra prediction mode is DC mode, the encoder may not use the that neighbor unit as MPM candidate. According to the exemplary embodiment of the method for deriving the MPM candidates, the encoder may select the prediction mode (for example, MPM (A, B)) to which the smallest table index is allocated among the prediction modes of the left neighbor unit A and the prediction modes of the upper neighbor unit B as the MPM candidates included in the MPM list. In this case, when the angular difference information indicates that the prediction mode angle of the unit A is the same as the prediction mode angle of the unit B, that is, when the mode number of the unit A is the same as the mode number of the unit B, the encoder may select the prediction modes regardless of the table index.

The table index may be allocated to the prediction mode based on the occurrence frequency and statistics of the prediction mode. For example, the smallest table index value may be allocated to the prediction mode having the highest occurrence frequency and the highest table index value may be allocated to the prediction modes having the lowest occurrence frequency.

The table index may not be allocated so as to meet the occurrence frequency of the prediction mode. That is, the table index may not be aligned according to the occurrence frequency. In this case, the encoder may select the prediction modes having the higher occurrence frequency among the prediction mode of the unit A and the prediction modes of the unit B as the MPM candidates included in the MPM list regardless of the table index value.

The encoder may also use the predetermined fixed number(N) of MPM candidates so as to encode the intra prediction mode. Here, N may be a positive integer.

As the exemplary embodiment, the number of MPM candidates included in the MPM list may be 2. For example, the encoder may select the prediction mode of the left neighbor unit A and the prediction mode of the upper neighbor unit B as the MPM candidates.

In this case, the number of MPM candidates derived from unit A and unit B may be below 2. For example, when the angular difference information indicates that the prediction mode angle of the unit A is the same as the prediction mode angle of the unit B, that is, when the mode number of the unit A is the same as the mode number of the unit B, the number of MPM candidates derived from the encoder may be 1. In this case, the remaining MPM candidates other than the MPM candidates derived from the unit A and the unit B may be set and/or derived as the predetermined mode. That is, the encoder may select the predetermined mode as additional MPM candidates. For example, the predetermined mode may be fixed to the DC. In addition, the predetermined mode may be a planar mode when the prediction modes of the unit A and the unit B are not the planar mode and may be the DC mode when the prediction modes of the unit A and the unit B are the planar mode.

In addition, when the unavailable units are present among the reconstructed neighbor units, the number of MPM candidates derived from the encoder may be 1. In this case, the remaining MPM candidates other than the MPM candidates derived from the unit A and the unit B may be set and/or derived as the predetermined mode. That is, the encoder may select the predetermined mode as additional MPM candidates. Herein, the predetermined mode may be, for example, the DC mode or the planar mode.

As another exemplary embodiment of the present invention, the number of MPM candidates included in the MPM list may be 3. For example, the encoder may select the prediction mode having the highest occurrence frequency among the prediction mode of the left neighbor unit A, the prediction modes of the upper neighbor unit B, and the prediction modes of the previously encoded units as the MPM candidates.

In this case, the number of MPM candidates derived from unit A and unit B may be below 2. For example, when the angular difference information indicates that the prediction mode angle of unit A is the same as the prediction mode angle of unit B, that is, when the mode number of unit A is the same as the mode number of unit B, the number of MPM candidates derived from the encoder may be 1. In addition, there may be the unavailable units among the reconstructed neighbor units. When the number of MPM candidates derived from the unit A and the unit B is below 2, the encoder may also select the plurality of prediction modes in order of the occurrence frequency among the prediction modes of the previously encoded unit as the MPM candidates.

The prediction mode select unit having the high occurrence frequency, that is the prediction mode select unit may be an encoding target picture, an encoding target slice, a largest coding unit (LCU), a coding unit (CU), and/or a prediction unit (PU) that include the encoding target unit. The encoder may also use a counter so as to calculate the occurrence frequency of the prediction modes. When the counter is used, the encoder may perform the encoding on the prediction mode select unit and then, initialize the counter. That is, the counter may be initialized as the prediction mode select unit.

When the MPM candidates are derived by the above-mentioned method, the encoder may generate the MPM list by using the derived MPM candidates. The encoder may determine whether the same MPM candidates as the prediction modes of the encoding target unit may be present within the MPM list. In this case, the encoder may transmit to the decoder the flag indicating whether the same MPM candidates as the prediction modes of the encoding target unit may be present within the MPM list. Hereinafter, the flag is referred to as the MPM flag.

According to the exemplary embodiment of the present invention, the MPM flag transmitted to the decoder may be represented by prev_intra_luma_pred_flag. For example, when the same MPM candidates as the prediction modes of the encoding target unit are present within the MPM list, the MPM flag may be allocated with 1 and otherwise, 0.

When the same MPM candidates as the prediction modes of the encoding target unit are present in the MPM list, the encoder may transmit to the decoder the index indicating whether the prediction modes of the encoding target unit is the same as any of the MPM candidates within the MPM list. Hereinafter, the index is referred to as the MPM index. In this case, the encoder and the decoder may be used the MPM candidates indicating the MPM index as the intra prediction mode of the encoding target unit.

When the number of MPM candidates included in the MPM list is 1, the encoder may not encode the MPM index. In addition, even when the decoder can know the same MPM candidates as the prediction mode of the decoding target unit, the encoder may not encode the MPM index. In this case, the encoder may encode only the MPM flag and transmit the encoded MPM flag to the decoder.

When the same MPM candidates as the prediction modes of the encoding target unit are not present within the MPM list, the encoder may derive a remaining mode by using the prediction modes and the MPM list of the current encoding target unit. Here, the remaining mode may derived by using the intra prediction mode other than the MPM candidates. The encoder may encode the generated remaining mode and transmit the encoded remaining mode to the decoder. According to the exemplary embodiment of the present invention, the remaining mode may be represented by rem_intra_luma_pred_mode.

The encoder may not use the reconstructed neighbor unit and/or the MPM candidates when encoding the intra prediction mode of the encoding target unit. In this case, the encoder may perform the entropy encoding on the intra prediction mode of the encoding target unit and may transmit the encoded intra prediction mode to the decoder.

Meanwhile, the encoder may perform the entropy encoding on the above-mentioned MPM flag, MPM index, remaining mode, and/or intra prediction mode and transmit them to the decoder In this case, upon performing the entropy encoding on each of the syntax elements, the encoder may perform the arithmetic encoding by using only the context model and may also use the fixed bit encoding. In this case, however, the intra prediction mode information on the reconstructed neighbor unit is not used and therefore, the encoding efficiency may be low. Therefore, a method for performing the entropy encoding by using the information on the intra prediction mode of the reconstructed neighbor unit, that is, the neighbor prediction mode information may be provided. As described above, the angular difference between the neighbor prediction modes and/or the mode number of the neighbor prediction mode, or the like, may be in the neighbor prediction mode information. Hereinafter, the exemplary embodiments of the method for performing the entropy encoding on the encoding target unit by using the neighbor prediction mode information will be described.

Figure 5:
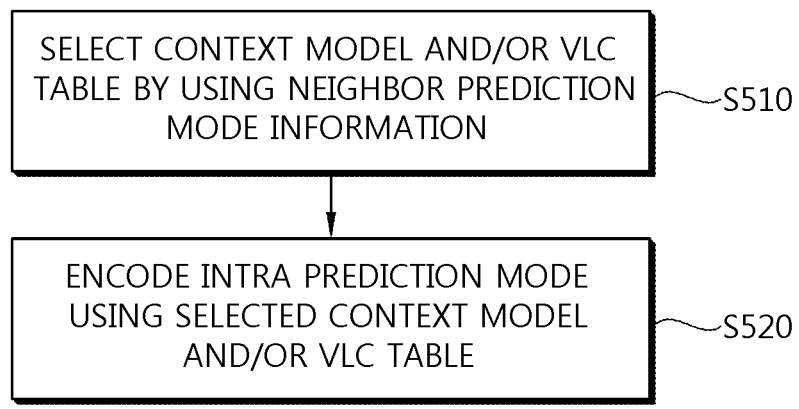
FIG. 5 is a flow chart showing an exemplary embodiment of a method for performing entropy encoding using neighbor prediction mode information.

FIG. 5 is a flow chart showing an exemplary embodiment of a method for performing entropy encoding using neighbor prediction mode information.

Referring to FIG. 5, the encoder may select the context model and/or the VLC table for the encoding target unit by using the neighbor mode information (S510). Herein, a variable length coding (VLC) table may have the same meaning as the variable length coding table.

The encoder may select and use one of the plurality of context models, upon performing the entropy encoding. In this case, the encoder may select the context model by using the angular difference information between the neighbor prediction modes and may select the context model by using the mode number and/or the mode sequence of the neighbor prediction modes. In addition, the encoder may also select the context model by using the angular difference information and the mode number information.

In addition, the encoder may select and use one of the plurality of VLC tables, upon performing the entropy encoding. In this case, the encoder may select the VLC table by using the angular difference information between the neighbor prediction modes and may select the context model by using the mode number and/or the mode sequence of the neighbor prediction modes. In addition, the encoder may also select the context model by using the angular difference information and the mode number information.

The encoder may perform the entropy encoding on the intra prediction mode of the encoding target unit by using the selected context model and/or VLC table (S520). In this case, as described above, the syntax element performing the entropy encoding may include the MPM flag, the MPM index, the remaining mode, and/or the intra mode, or the like, as described above.

FIG. 6 is a table showing an exemplary embodiment of a method for selecting a context model according to angular difference information.

Reference numeral 610 of FIG. 6 is a table indicating an example of the angular difference information between neighbor prediction modes. Reference numeral 610 of FIG. 6, VER may represent vertical direction prediction, HOR may represent horizontal direction prediction, and DC may represent DC prediction.

As described above, each of the intra prediction mode may have the prediction direction corresponding thereto and each prediction direction may have a predetermined angle value. Therefore, the prediction direction difference between the neighbor prediction modes may be defined by the angular difference between the neighbor prediction modes. The encoder and the decoder may likewise store the table including the angular difference information and the encoder and the decoder may derive the angular difference between the neighbor prediction modes by using the stored table.

Reference numeral 620 of FIG. 6 is a table indicating an example of a context category of the angular difference between the neighbor prediction modes. At reference numeral 620 of FIG. 6, d represents the angular difference value, ctxN (N is 1, 2, 3, or 4) may represent the context model applied to the syntax element of the encoding target unit. In addition, Th1 (Threshold1), Th2 (Threshold2), Th3 (Threshold3), Th4 (Threshold4) may each represent the threshold value of the angular difference.

Referring to reference numeral 620 of FIG. 6, the encoder may select one of four different context models by using the angular difference information. For example, when the angular difference between the neighbor prediction modes is larger than Th1 and is smaller than Th2, the encoder may select ctx2 as the context model for the encoding target unit.

Reference numeral 630 of FIG. 6 is a table indicating another example of a context category according to the angular difference between the neighbor prediction modes. Referring to reference numeral 630 of FIG. 6, the encoder may select one of four different context models by using the angular difference information.

For example, it is assumed that the intra prediction mode of the left neighbor unit A is 1 (HOR) and the intra prediction mode of the upper neighbor unit B is 33 (HOR+7). Here, 1 (HOR) may represent the prediction mode of which the mode number 1 and 33 (HOR+7) may represent the prediction mode of which the mode number is 33. In this case, referring to reference numeral 610 of FIG. 6, the angular difference between the neighbor prediction modes may be 35. Therefore, the encoder may select the ctx1 as the context model for the encoding target unit.

Although the above-mentioned exemplary embodiment describes the case in which the angular difference information is derived by using the left neighbor unit A and the upper neighbor unit B, the method for deriving the angular difference information is not limited to the exemplary embodiment. The angular difference information between the neighbor prediction modes may be derived by various methods using the available units among the reconstructed neighbor units.

In addition, in the above-mentioned exemplary embodiment, each context model ctx1 to ctx4 may have different initial values. In this case, a most probable state (MPS) and a probability value of the most probable state (MPS) may be determined by using different initial values in each context model and the coding parameter of the quantization parameter, or the like, may be used for determining the MPS and the MPS probability value.

FIG. 7 is a table showing an exemplary embodiment of a method for selecting a VLC table according to the angular difference information.

Reference numeral 710 of FIG. 7 is a table indicating an example of the angular difference information. As described above, each of the intra prediction mode may have the prediction direction corresponding thereto and each prediction direction may have a predetermined angle value. Therefore, the prediction direction difference between the neighbor prediction modes may be defined by the angular difference between the neighbor prediction modes. The encoder and the decoder may store the table including the angular difference information and the encoder and the decoder may derive the angular difference between the neighbor prediction modes by using the stored table.

Reference numeral 720 of FIG. 7 is a table indicating an example of a VLC table category according to the angular difference between the neighbor prediction modes. At reference numeral 720 of FIG. 7, d represents the angular difference value, VLCN (N is 1, 2, 3, or 4) may represent the VLC table applied to the syntax element of the encoding target unit. In addition, Th1 (Threshold1), Th2 (Threshold2), Th3 (Threshold3), Th4 (Threshold4) may each represent the threshold value of the angular difference.

Referring to reference numeral 720 of FIG. 7, the encoder may select one of four different VLC tables by using the angular difference information. For example, when the angular difference between the neighbor prediction modes is larger than Th1 and is smaller than Th2, the encoder may select VLC2 as the VLC table for the encoding target unit.

Reference numeral 730 of FIG. 7 is a table indicating another example of a VLC table category according to the angular difference between the neighbor prediction modes. Referring to reference numeral 730 of FIG. 7, the encoder may select one of four different VLC tables by using the angular difference information. In reference numeral 730 of FIG. 7, when the angular difference value is 45 or less, VLC1 may be selected as the VLC table for the encoding target unit, when the angular difference value is larger than 45 and smaller than 90, VLC2 may be selected as the VLC table for the encoding target unit, when the angular difference value is larger than 90 and smaller than 135, VLC3 may be selected as the VLC table for the encoding target unit, and when the angular difference value is larger than 135, VLC4 may be selected as the VLC table for the encoding target unit.

For example, it is assumed that the intra prediction mode of the left neighbor unit A is 1 (HOR) and the intra prediction mode of the upper neighbor unit B is 33 (HOR+7). Here, 1 (HOR) may represent the prediction mode of which the mode number 1 and 33 (HOR+7) may represent the prediction mode of which the mode number is 33. In this case, referring to reference numeral 710 of FIG. 7, the angular difference between the neighbor prediction modes may be 35. Therefore, the encoder may select the VLC1 as the VLC table for the encoding target unit.

Reference numeral 740 of FIG. 7 is a table indicating another example of the VLC table category according to the angular difference between the neighbor prediction modes referring to reference numeral 740 of FIG. 7, the encoder may select one of two different VLC tables by using the angular difference information. At reference numeral 740 of FIG. 7, when the angular difference value is 0, that is, when the neighbor prediction modes are the same (d=0), VLC1 may be selected as the VLC table for the encoding target unit. In addition, when the angular difference value is not 0, that is, when the neighbor prediction modes are not the same (d!=0), the VLC2 may be selected as the VLC for the encoding target table.

For example, it is assumed that the intra prediction mode of the left neighbor unit A is 1 (HOR) and the intra prediction mode of the upper neighbor unit B is 1 (HOR). Herein, 1 (HOR) may represent the prediction mode of which the mode number is 1. In this case, the intra prediction mode of the left neighbor unit A and the intra prediction mode of the upper neighbor unit B are the same and therefore, the angular difference between the neighbor prediction modes may be 0. Therefore, the encoder may select the VLC1 as the VLC table for the encoding target unit.

As another example, it is assumed that the intra prediction mode of the left neighbor unit A is 1 (HOR) and the intra prediction mode of the upper neighbor unit B is 33 (HOR+7). Here, 1 (HOR) may represent the prediction mode of which the mode number is 1 and 33 (HOR+7) may represent the prediction mode of which the mode number is 33. In this case, the intra prediction mode of the left neighbor unit A and the intra prediction mode of the upper neighbor unit B are not the same and therefore, the angular difference between the neighbor prediction modes may not be 0. Therefore, the encoder may select the VLC2 as the VLC table for the encoding target unit.

Although the above-mentioned exemplary embodiment describes the case in which the angular difference information is derived by using the left neighbor unit A and the upper neighbor unit B, the method for deriving the angular difference information is not limited to the exemplary embodiment. The angular difference information between the neighbor prediction modes may be derived by various methods using the available units among the reconstructed neighbor units.

FIG. 8 is a table showing an exemplary embodiment of codewords allocated to each of the plurality of VLC tables.

Referring to FIG. 8, in each VLC table, the allocated codewords may be different according to each symbol value and/or each syntax element in each VLC table. In this case, the encoder may improve the encoding efficiency by allocating the codewords having the short length to the symbol having the high occurrence probability.

The encoder may update each of the VLC tables during the encoding process. For example, the VLC1 of FIG. 8, when the occurrence frequency of symbol value 2 is higher than the occurrence frequency of symbol value 1, the encoder may change codeword '01' allocated to symbol value 1 and codeword '001' allocated to symbol value 2. After the update is performed, the encoder may perform the entropy encoding by using the updated VLC table.

Figure 9:
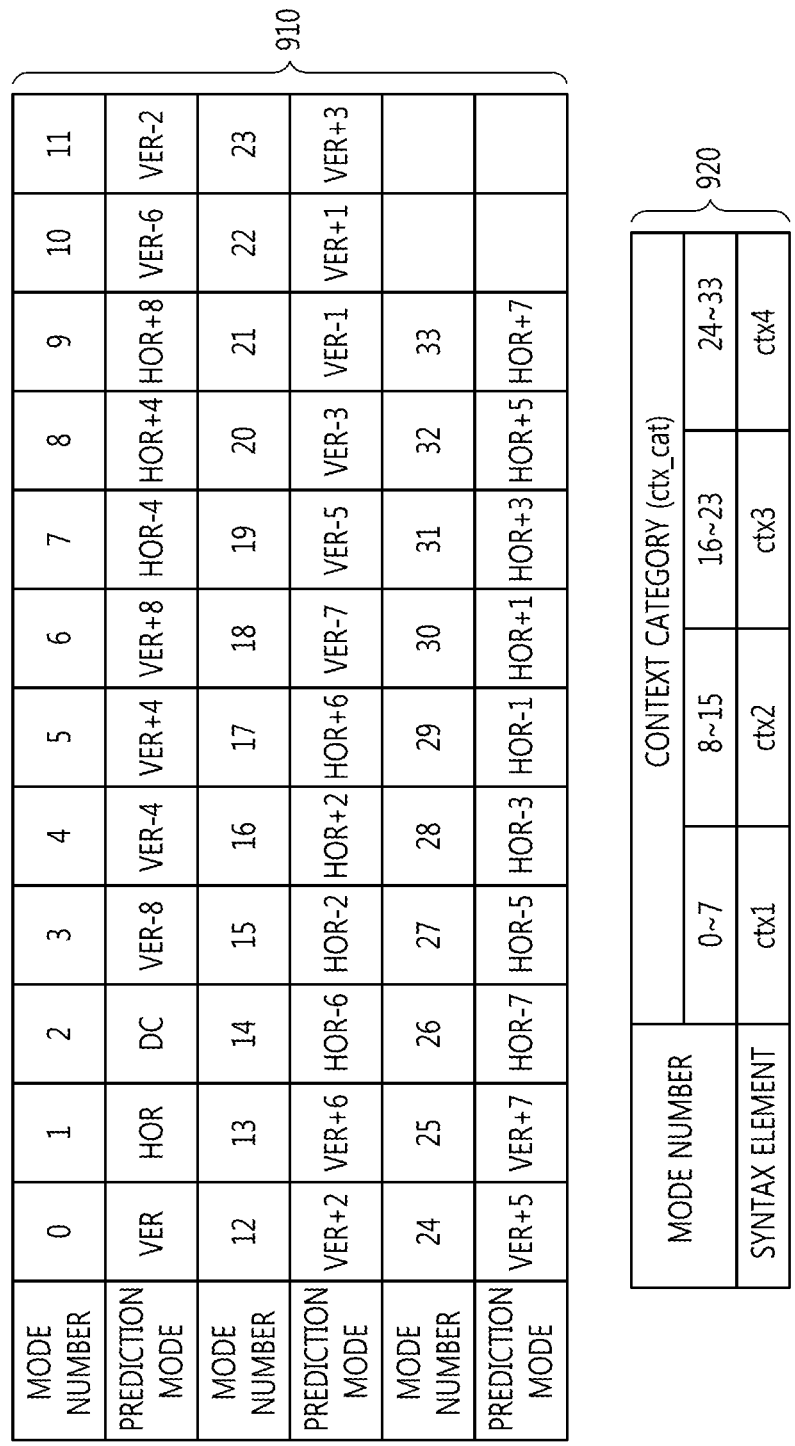
FIG. 9 is a table showing an exemplary embodiment of a method for selecting a context model according to a mode number of neighbor prediction modes.

FIG. 9 is a table showing an exemplary embodiment of a method for selecting a context model according to a mode number of a neighbor prediction mode.

Reference numeral 910 of FIG. 9 is a table representing an example of the mode number allocated to the neighbor prediction mode. Reference numeral 910 of FIG. 9 shows the embodiment of the case in which the number of intra prediction modes included in the reconstructed neighbor units is 34.

As described above, the mode number allocated to the intra prediction mode may be determined according to the occurrence probability of the intra prediction mode. In this case, the prediction mode having the high occurrence probability may be allocated with the low mode number. For example, in the table of reference numeral 910 of FIG. 9, the occurrence probability of the VER prediction mode may be highest. Therefore, the mode number of the neighbor prediction modes may also represent the mode sequence of the neighbor prediction modes.

Reference numeral 920 of FIG. 9 shows a table indicating an example of a context category according to the mode number of the neighbor prediction modes. At reference numeral 920 of FIG. 9, ctxN (N is 1, 2, 3, or 4) may represent the context model applied to the syntax element of the encoding target unit. Referring to reference numeral 920 of FIG. 9, the encoder may select one of four different context models by using the mode number of the neighbor prediction mode.

For example, it is assumed that the intra prediction mode of the left neighbor unit A is 0 (VER) and the intra prediction mode of the upper neighbor unit B is 6 (VER+6). Here, 0 (VER) may represent the prediction mode of which the mode number 0 and 6 (VER+6) may represent the prediction mode of which the mode number is 6. In this case, referring to 920 of FIG. 9, the mode number of the unit A and the mode number of the unit B may be included in the same context category. Since the context model corresponding to the context category is ctx1, the ctx1 may be selected as the context model for the encoding target unit.

As another example, it is assumed that the intra prediction mode of the left neighbor unit A is 8 (HOR+4) and the intra prediction mode of the upper neighbor unit B is 21 (VER−1). Here, 8 (HOR+4) may represent the prediction mode of which the mode number is 8 and 21 (VER−1) may represent the prediction mode of which the mode number is 21. Referring to 920 of FIG. 9, the mode number of the unit A and the mode number of the unit B may be included in different context category. In this case, the encoder may select the context model corresponding to smaller mode number (for example, mode number 8). Since the context model corresponding to the mode number 8 is ctx2, the ctx2 may be selected as the context model for the encoding target unit.

Although the above-mentioned exemplary embodiment describes the case in which the context model is selected by using the left neighbor unit A and the upper neighbor unit B, the method for selecting a context model is not limited to the exemplary embodiment. The mode number information used to select the context mode may be derived by various methods using the available units among the reconstructed neighbor units.

Figure 10:
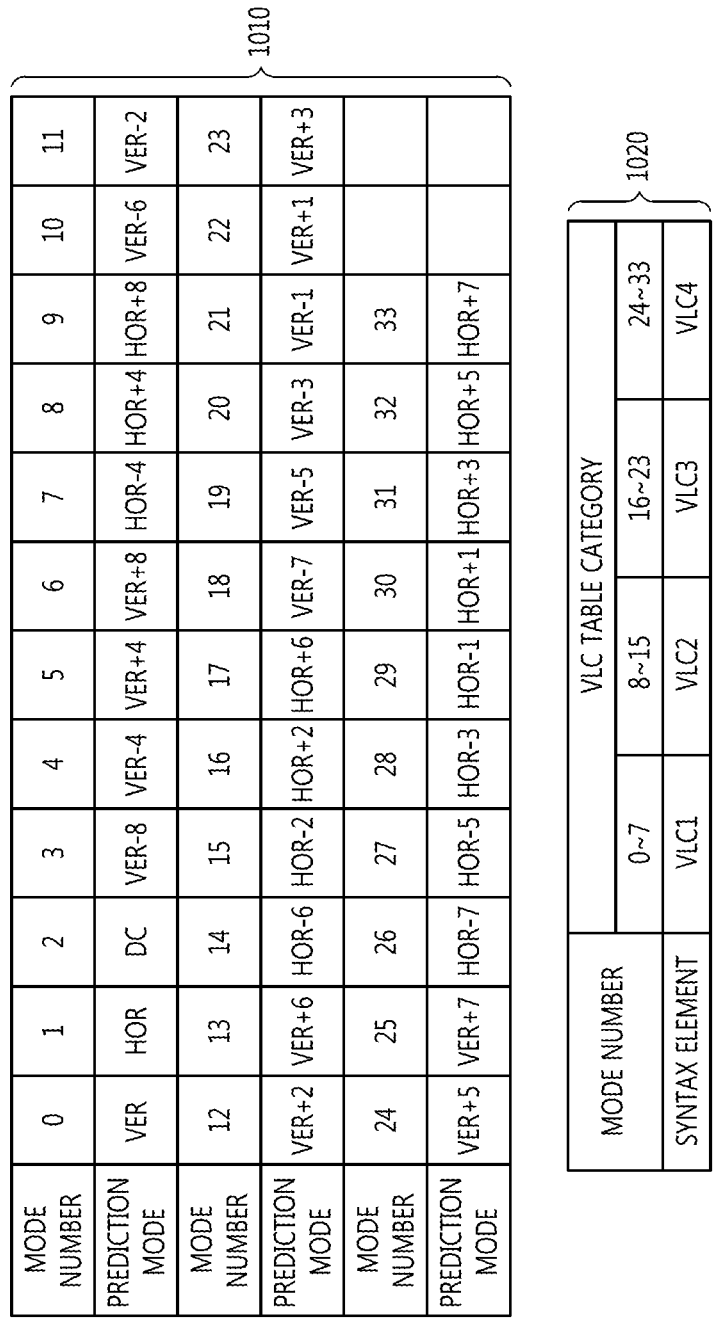
FIG. 10 is a table showing an exemplary embodiment of a method for selecting a VLC table according to the mode number of the neighbor prediction modes.

FIG. 10 is a table showing an exemplary embodiment of a method for selecting a VLC table according to the mode number of the neighbor prediction mode.

Reference numeral 1010 of FIG. 10 is a table representing an example of the mode number allocated to the neighbor prediction mode. Reference numeral 1010 of FIG. 10 shows the embodiment of the case in which the number of intra prediction modes included in the reconstructed neighbor units is 34.

As described above, the mode number allocated to the intra prediction mode may be determined according to the occurrence probability of the intra prediction mode. In this case, the prediction mode having the high occurrence probability may be allocated with the low mode number. For example, in the table of reference numeral 1010 of FIG. 10, the occurrence probability of the VER prediction mode may be highest. Therefore, the mode number of the neighbor prediction modes may also represent the mode sequence of the neighbor prediction modes.

Reference numeral 1020 of FIG. 10 shows a table indicating an example of a VLC table category according to the mode number of the neighbor prediction modes. At reference numeral 1020 of FIG. 10, the VLCN (N is 1, 2, 3, or 4) may represent the VLC table applied to the syntax element of the encoding target unit. Referring to reference numeral 1020 of FIG. 10, the encoder may select one of four different VLC tables by using the mode number of the neighbor prediction mode.

For example, it is assumed that the intra prediction mode of the left neighbor unit A is 0 (VER) and the intra prediction mode of the upper neighbor unit B is 6 (VER+6). Here, 0 (VER) may represent the prediction mode of which the mode number 0 and 6 (VER+6) may represent the prediction mode of which the mode number is 6. In this case, referring to 1020 of FIG. 10, the mode number of the unit A and the mode number of the unit B may be included in the same context category. The VLC table corresponding to the category is VLC1 and therefore, the encoder may select the VLC1 as the VLC table for the encoding target unit.

As another example, it is assumed that the intra prediction mode of the left neighbor unit A is 8 (HOR+4) and the intra prediction mode of the upper neighbor unit B is 21 (VER−1). Here, 8 (HOR+4) may represent the prediction mode of which the mode number is 8 and 21 (VER−1) may represent the prediction mode of which the mode number is 21. Referring to 1020 of FIG. 10, the mode number of the unit A and the mode number of the unit B may be included in different context category. In this case, the encoder may select the VLC table corresponding to smaller mode number (for example, mode number 8). The VLC table corresponding to the mode number 8 is VLC2 and therefore, the encoder may select the VLC2 as the VLC table for the encoding target unit.

Although the above-mentioned exemplary embodiment describes the case in which the context model is selected by using the left neighbor unit A and the upper neighbor unit B, the method for selecting a context model is not limited to the exemplary embodiment. The mode number information used to select the context mode may be derived by various methods using the available units among the reconstructed neighbor units.

FIG. 11 is a table showing the exemplary embodiment of the method for selecting a context model using the angular difference information between the neighbor prediction modes and the mode number information on the neighbor prediction modes.

In FIG. 11, ctxN (N is 1, 2, 3, or 4) may represent the context model applied to the syntax element of the encoding target unit. Referring to FIG. 11, the encoder may select one of four different context models by using the angular difference between the neighbor prediction modes and the mode number of the neighbor prediction mode.

For example, it is assumed that the intra prediction mode of the left neighbor unit A is 1 (HOR) and the intra prediction mode of the upper neighbor unit B is 33 (HOR+7). Here, 1 (HOR) may represent the prediction mode of which the mode number 1 and 33 (HOR+7) may represent the prediction mode of which the mode number is 33. In this case, the angular difference between the neighbor prediction modes may be 35. In addition, since the mode number of the unit A and the mode number of the unit B are included in different categories, the encoder may select the context model corresponding to the smaller mode number (for example, mode number 1). Therefore, the encoder may select the ctx1 as the context model for the encoding target unit.

FIG. 12 is a table showing an exemplary embodiment of a method for selecting a VLC table using the angular difference information between the neighbor prediction modes and the mode number information on the neighbor prediction modes.

In FIG. 12, the VLCN (N is 1, 2, 3, or 4) may represent the VLC table applied to the syntax element of the encoding target unit. Referring to FIG. 12, the encoder may select one of four different VLC tables by using the angular difference between the neighbor prediction modes and the mode number of the neighbor prediction mode.

For example, it is assumed that the intra prediction mode of the left neighbor unit A is 0 (VER) and the intra prediction mode of the upper neighbor unit B is 0 (VER+6). Herein, 0 (HOR) may represent the prediction mode of which the mode number is 0. In this case, the angular difference between the neighbor prediction modes may be 0. In addition, since the mode number of the unit A and the mode number of the unit B is included in the same category and therefore, the encoder may select the VLC table corresponding to the same category. Therefore, the encoder may select the VLC1 as the VLC table for the encoding target unit.

As another example, it is assumed that the intra prediction mode of the left neighbor unit A is 1 (HOR) and the intra prediction mode of the upper neighbor unit B is 33 (HOR+7). Here, 1 (HOR) may represent the prediction mode of which the mode number 1 and 33 (HOR+7) may represent the prediction mode of which the mode number is 33. In this case, the angular difference between the neighbor prediction modes may be 35 rather than 0. In addition, since the mode number of the unit A and the mode number of the unit B are included in different categories, the encoder may select the VLC table corresponding to the smaller mode number (for example, mode number 1). Therefore, the encoder may select the VLC2 as the VLC table for the encoding target unit.

Meanwhile, as described above, the encoder may derive the neighbor prediction mode information on the encoding target unit by using the reconstructed neighbor unit. Herein, the angular difference between the neighbor prediction modes and/or the mode number of the neighbor prediction mode, or the like, may be in the neighbor prediction mode information.

The number of reconstructed neighbor units may be 2 or more. In this case, the encoder selects two units having coding parameters most similar to the coding parameter of the encoding target prediction unit among the reconstructed neighbor units, which may be used to derive the neighbor prediction mode information.

In addition, the number of intra prediction modes included in the decoding target unit and the number of intra prediction mode included in the reconstructed neighbor unit may be different from each other. In this case, the encoder may also use only the intra prediction mode commonly included in the encoding target unit and the reconstructed neighbor unit, upon deriving the neighbor prediction mode information.

In addition, the first syntax element related to the intra prediction mode and the predetermined second syntax element different from the first syntax element may be represented in the VLC table used for the entropy encoding. In this case, the VLC table may be referred to as the integrated VLC table. In this case, the encoder may encode the first syntax element and the second syntax element by using the integrated VLC table.

According to the method for encoding the above-mentioned intra prediction mode, the encoder can efficiently encode the intra prediction mode by using the information on the neighbor prediction mode. Therefore, the encoding can be efficiently performed according to the change in peripheral conditions and the encoding efficiency can be improved.

Figure 13:
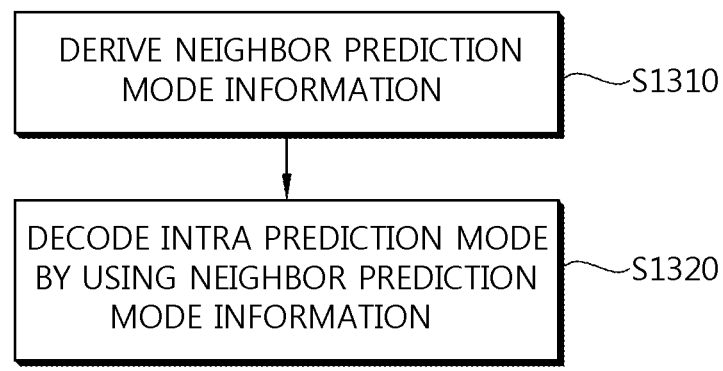
FIG. 13 is a flow chart schematically showing a method for decoding an intra prediction mode according to an exemplary embodiment of the present invention.

FIG. 13 is a flow chart schematically showing a method for decoding an intra prediction mode according to an exemplary embodiment of the present invention.

Referring to FIG. 13, the decoder may derive the information on the neighbor prediction mode (S1310). Herein, the angular difference between the neighbor prediction modes and/or the mode number of the neighbor prediction mode, or the like, may be in the neighbor prediction mode information. The decoder may derive the neighbor prediction mode information by using the same method as the encoder.

When the neighbor prediction mode information is derived, the decoder can decode the intra prediction mode for the decoding target unit by using the derived neighbor prediction mode information (S1320).

The decoder may derive the MPM candidates for the decoding target unit so as to decode the intra prediction mode for the decoding target unit. The MPM candidate may be derived by using the intra prediction modes of the reconstructed neighbor unit. The decoder may also use the neighbor prediction mode information (for example, the angular difference between the neighbor prediction modes and/or the mode number of the neighbor prediction mode), upon deriving the MPM candidates. The method for deriving the MPM candidates is the same as the method for deriving the MPM candidate in the encoder and therefore, the description thereof will be omitted. When the MPM candidates are derived, the decoder may generate the MPM list by using the derived MPM candidates.

As described above, the encoder may encode the MPM flag and transmit the encoded MPM flag to the decoder. Here, the MPM flag is a flag indicating whether the same MPM candidates as the prediction mode of the encoding target unit are present in the MPM list. In this case, the decoder can receive and decode the MPM flag. The decoder may determine whether the same MPM candidates as the prediction mode of the decoding target unit are present in the MPM list by using the decoded MPM flag.

When the same MPM candidates as the prediction mode of the encoding target unit are present in the MPM list, the encoder may encode the MPM index and transmit the encoded MPM index to the decoder. Here, the MPM index is an index indicating whether the prediction mode of the encoding target unit is the same as any of the MPM candidates within the MPM list. In this case, the decoder can receive and decode the MPM index. The decoder may use the MPM candidates indicated by the decoded MPM index among the MPM candidates within the MPM list as the intra prediction mode of the decoding target unit.

When the number of MPM candidates included in the MPM list is 1, the encoder may not encode the MPM index. In addition, even when the decoder can know the same MPM candidates as the prediction mode of the decoding target unit, the encoder may not encode the MPM index. In this case, the decoder can omit the process of receiving and decoding the MPM index.

When the same MPM candidates as the prediction mode of the encoding target unit are present in the MPM list, the encoder may encode the remaining mode and transmit the encoded remaining mode to the decoder. In this case, the decoder can receive and decode the remaining mode.

The encoder may not use the reconstructed neighbor unit and/or the MPM candidates up encoding the intra prediction mode of the encoding target unit. In this case, the encoder may perform the entropy encoding on the intra prediction mode of the encoding target unit and may transmit the encoded intra prediction mode to the decoder. In this case, the decoder may receive the encoded intra prediction mode and perform the entropy decoding thereon.

Meanwhile, the decoder may perform the entropy decoding on the above-mentioned MPM flag, the MPM index, the remaining mode, and/or the intra prediction mode. In this case, upon performing the entropy decoding on each of the syntax elements, the decoder may perform the arithmetic decoding by using only one context model and may also use the fixed bit decoding. In this case, however, the intra prediction mode information of the reconstructed neighbor unit is not used and therefore, the decoding efficiency may be low. Therefore, a method for performing the entropy decoding by using the information on the intra prediction mode of the reconstructed neighbor unit, that is, the neighbor prediction mode information may be provided.

Figure 14:
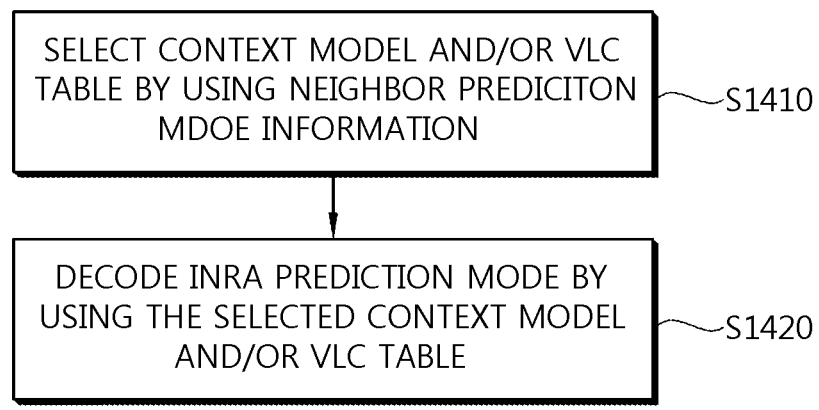
FIG. 14 is a flow chart showing an exemplary embodiment of a method for performing entropy decoding using the neighbor prediction mode information.

FIG. 14 is a flow chart showing an exemplary embodiment of a method for performing entropy decoding using the neighbor prediction mode information.

Referring to FIG. 14, the decoder may select the context model and/or the VLC table for the decoding target unit by using the neighbor mode information (S1410).

The decoder may select and use one of the plurality of context models, upon performing the entropy decoding. In this case, the decoder may select the context model by using the angular difference information between the neighbor prediction modes and may select the context model by using the mode number and/or the mode sequence of the neighbor prediction modes. In addition, the decoder may also select the context model by using the angular difference information and the mode number information.

In addition, the decoder may select and use one of the plurality of VLC tables, upon performing the entropy decoding. In this case, the decoder may select the VLC table by using the angular difference information between the neighbor prediction modes and may select the context model by using the mode number and/or the mode sequence of the neighbor prediction modes. In addition, the decoder may also select the context model by using the angular difference information and the mode number information.

The decoder may select the context model and/or the VLC table for the decoding target unit by the same method as the encoder. The detailed exemplary embodiment of the method for selecting the context model and the VLC table is described above and therefore, the description thereof will be omitted.

The decoder may perform the entropy decoding on the intra prediction mode of the decoding target unit by using the selected context model and/or the VLC table (S1420). In this case, as described above, the syntax element performing the entropy decoding may include the MPM flag, the MPM index, the remaining mode, and/or the intra mode, or the like, as described above.

According to the method for decoding the above-mentioned intra prediction mode, the decoder can efficiently decode the intra prediction mode by using the information on the neighbor prediction mode. Therefore, the decoding can be efficiently performed according to the change in peripheral conditions and the decoding efficiency can be improved.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belong to the following claims.

The invention claimed is:

1. A video decoding apparatus comprising:
an entropy decoding module to perform entropy-decoding on an input bitstream to derive quantized transform coefficients related to a target decoding unit;
an inverse-quantization module to perform inverse-quantization on the quantized transform coefficients to derive transform coefficients;
a prediction module to
receive and decode a most probable mode (MPM) flag and an MPM index for the target decoding unit;
derive neighbor prediction mode information from a left neighbor prediction mode and an upper neighbor prediction mode;
determine MPM candidates for the target decoding unit using the neighbor prediction mode information;
generate an MPM list using the determined MPM candidates;
derive an intra prediction mode of the target decoding unit using the decoded MPM index and the generated MPM list; and
perform intra prediction on the target decoding unit based on the derived intra prediction mode, and
an adder to add a residual block generated based on the transform coefficients and a prediction block generated by the intra prediction to generate a reconstructed block,
wherein the left neighbor prediction mode is an intra prediction mode of a left neighbor unit adjacent to a left side of the target decoding unit and the upper neighbor prediction mode is an intra prediction mode of an upper neighbor unit adjacent to an upper side of the target decoding unit, and the MPM index is an index indicating the same candidate as the intra prediction mode of the target decoding unit, among the MPM candidates included in the MPM list,
wherein the neighbor prediction mode information includes a mode number of the left neighbor prediction mode and a mode number of the upper neighbor prediction mode,
wherein the prediction module determines the left neighbor prediction mode and the upper neighbor prediction mode as the MPM candidates, and the MPM list comprises three MPM candidates, and
wherein the prediction module determines a predetermined intra prediction mode as an additional MPM candidate when the left neighbor prediction mode is the same as the upper neighbor prediction mode.

2. The video decoding apparatus of claim 1, wherein the predetermined intra prediction mode is a DC mode or planar mode.

3. The video decoding apparatus of claim 2, wherein the predetermined intra prediction mode is a DC mode when the left neighbor prediction mode and the upper neighbor prediction mode are a planar mode, and the predetermined intra prediction mode is a planar mode when the left neighbor prediction mode and the upper neighbor prediction mode are a DC mode.

4. A video encoding apparatus comprising:
a prediction module to
determine an intra prediction mode of a target encoding unit;
perform intra prediction on the target encoding unit based on the determined intra prediction mode;

derive neighbor prediction mode information from a left neighbor prediction mode and an upper neighbor prediction mode;

determine MPM candidates for the target encoding unit using the neighbor prediction mode information;

generate an MPM list using the determined MPM candidates;

derive an MPM index using the intra prediction mode of the target encoding unit and the generated MPM list; and encode a most probable mode (MPM) flag and the MPM index for the target encoding unit;

a subtractor to generate a residual block using the prediction block generated by the intra prediction and the target encoding unit;

a quantization module to perform quantization on transform coefficients related to the residual block to derive quantized transform coefficients; and an entropy encoding module to perform entropy-encoding on the quantized transform coefficients, wherein the left neighbor prediction mode is an intra prediction mode of a left neighbor unit adjacent to a left side of the target encoding unit and the upper neighbor prediction mode is an intra prediction mode of an upper neighbor unit adjacent to an upper side of the target encoding unit, and the MPM index is an index indicating the same candidate as the intra prediction mode of the target encoding unit, among the MPM candidates included in the MPM list, wherein the neighbor prediction mode information includes a mode number of the left neighbor prediction mode and a mode number of the upper neighbor prediction mode, wherein the prediction module determines the left neighbor prediction mode and the upper neighbor prediction mode as the MPM candidates, and the MPM list comprises three MPM candidates, and wherein the prediction module determines a predetermined intra prediction mode as an additional MPM candidate when the left neighbor prediction mode is the same as the upper neighbor prediction mode.

5. The video encoding apparatus of claim 4, wherein the predetermined intra prediction mode is a DC mode or planar mode.

6. The video encoding apparatus of claim 5, wherein the predetermined intra prediction mode is a DC mode when the left neighbor prediction mode and the upper neighbor prediction mode are a planar mode, and the predetermined intra prediction mode is a planar mode when the left neighbor prediction mode and the upper neighbor prediction mode are a DC mode.

7. A non-transitory computer-readable medium storing a bitstream that is generated by a video encoding apparatus, the apparatus comprising:

a prediction module to determine an intra prediction mode of a target encoding unit;

perform intra prediction on the target encoding unit based on the determined intra prediction mode;

derive neighbor prediction mode information from a left neighbor prediction mode and an upper neighbor prediction mode;

determine MPM candidates for the target encoding unit using the neighbor prediction mode information;

generate an MPM list using the determined MPM candidates;

derive an MPM index using the intra prediction mode of the target encoding unit and the generated MPM list; and encode a most probable mode (MPM) flag and the MPM index for the target encoding unit;

a subtractor to generate a residual block using the prediction block generated by the intra prediction and the target encoding unit;

a quantization module to perform quantization on transform coefficients related to the residual block to derive quantized transform coefficients; and an entropy encoding module to perform entropy-encoding on the quantized transform coefficients, wherein the left neighbor prediction mode is an intra prediction mode of a left neighbor unit adjacent to a left side of the target encoding unit and the upper neighbor prediction mode is an intra prediction mode of an upper neighbor unit adjacent to an upper side of the target encoding unit, and the MPM index is an index indicating the same candidate as the intra prediction mode of the target encoding unit, among the MPM candidates included in the MPM list, wherein the neighbor prediction mode information includes a mode number of the left neighbor prediction mode and a mode number of the upper neighbor prediction mode, wherein the prediction module determines the left neighbor prediction mode and the upper neighbor prediction mode as the MPM candidates, and the MPM list comprises three MPM candidates, and wherein the prediction module determines a predetermined intra prediction mode as an additional MPM candidate when the left neighbor prediction mode is the same as the upper neighbor prediction mode.

* * * * *